(12) United States Patent
Sweeney et al.

(10) Patent No.: US 11,403,557 B2
(45) Date of Patent: Aug. 2, 2022

(54) SYSTEM AND METHOD FOR SCALABLE, INTERACTIVE, COLLABORATIVE TOPIC IDENTIFICATION AND TRACKING

(71) Applicant: Capital One Services, LLC, McLean, VA (US)

(72) Inventors: Mackenzie Sweeney, Bristow, VA (US); R. M. Keelan Downton, Arlington, VA (US); Matthew Der, Richmond, VA (US); Raymond Lucas, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 55 days.

(21) Appl. No.: 16/412,783

(22) Filed: May 15, 2019

(65) Prior Publication Data

US 2020/0364610 A1 Nov. 19, 2020

(51) Int. Cl.
G06F 17/00 (2019.01)
G06F 17/20 (2006.01)
G06N 20/00 (2019.01)
G06F 16/904 (2019.01)

(52) U.S. Cl.
CPC .......... *G06N 20/00* (2019.01); *G06F 16/904* (2019.01)

(58) Field of Classification Search
None
See application file for complete search history.

(56) References Cited

U.S. PATENT DOCUMENTS

| | | | | |
|---|---|---|---|---|
| 5,826,261 A * | 10/1998 | Spencer | ................ | G06F 16/334 707/999.005 |
| 9,015,194 B2 * | 4/2015 | Ziv | ......................... | G06F 16/35 707/778 |
| 10,063,406 B2 * | 8/2018 | Tapia | ..................... | G06N 20/00 |
| 2006/0129606 A1 * | 6/2006 | Horvitz | ................ | G06F 16/148 707/999.107 |
| 2013/0325436 A1 * | 12/2013 | Wang | .................. | G06F 17/2715 704/9 |

(Continued)

OTHER PUBLICATIONS

Blei et al., "Latent Dirichlet Allocation", Journal of Machine Learning Research, Mar. 1, 2003, vol. 3, pp. 993-1022.

(Continued)

*Primary Examiner* — Luis A Sitiriche
(74) *Attorney, Agent, or Firm* — KDB Firm PLLC

(57) ABSTRACT

A topic tracking platform is disclosed that includes a machine-learning model that may be trained to expose topics in a corpus in response to a training table. Because topics are exposed, rather than searched for using existing taxonomies, the sensitivity of a topic tracking platform may be increased, and emerging topic trends may be more quickly flagged. Exposed topics may be automatically labelled, increasing the specificity of the topic tracking platform by overcoming the potential for topic labelling inconsistencies currently experienced in the art. Documents may be scored for each topic using information provided at a token granularity, and the contribution that each token of each document contributes to the topic may be visually represented. In some aspects, mechanisms are provided for reviewing topics of the corpus at varying granularities, including at a topic level, document level or token level granularity.

20 Claims, 8 Drawing Sheets

(56) References Cited

U.S. PATENT DOCUMENTS

2014/0095519 A1* 4/2014 Liu .................... G06F 16/81
707/755
2015/0235143 A1* 8/2015 Eder .................... G16H 50/50
706/12

OTHER PUBLICATIONS

Sievert et al., "LDAvis: A method for visualizing and interpreting topics", Proceedings of the Workshop on Interactive Language Learning, Visualization, and Interfaces, Jun. 27, 2014, pp. 63-70, Association for Computational Linguistics.

Xuirui et al., "Topics over Time: A Non-Markov Continuous-Time Model of Topical Trends", KDD 2006 Proceedings of the 12th ACM SIGKDD International Conference on Knowledge Discovery and Data Mining, Aug. 20-23, 2006, pp. 424-433, Philadelphia, Pennsylvania, USA.

Blei et al., "Dynamic Topic Models", Proceeding ICML 2006 Proceedings of the 23rd international conference on Machine learning, Jun. 25-29, 2006, pp. 113-120, Pittsburgh, Pennsylvania, USA.

Teh et al., "Hierarchical Dirichlet Processes", Journal of the American Statistical Association, Jan. 1, 2012, pp. 1-30.

* cited by examiner

400

| Words | eat | turkey | on | day |
|---|---|---|---|---|
| Topic 1 | 0.133 | 0.0000665 | 0.0000665 | 0.0666 |
| Topic 2 | 0.00037 | 0.111 | 0.148 | 0.00037 |

| | Topic 1 | Topic 2 |
|---|---|---|
| Doc 1 | 0.5 | 0.5 |
| Doc 2 | 0.55 | 0.45 |
| Doc 3 | 0.375 | 0.625 |
| Doc 4 | 0.333 | 0.666 |
| Doc 5 | 0.333 | 0.666 |
| Doc 6 | 0.4 | 0.6 |
| Doc 7 | 0.1818 | 0.8182 |
| Doc 8 | 0.6 | 0.4 |

SYSTEM AND METHOD FOR SCALABLE, INTERACTIVE, COLLABORATIVE TOPIC IDENTIFICATION AND TRACKING

BACKGROUND

It is important for any company's success to solicit and accept feedback from employees and clients. Feedback from employees may relate to corporate governance and compliance issues, including complaints alleging harassment or violation of the law by corporate employees. Feedback from clients may relate to the failure or success of a product or service provided by the company. Companies may implement policies to handle complaints in a manner that complies with federal and state laws and regulations.

As a company grows, the volume of feedback data continues to grow, and automated processes have been developed to search the data using a fixed taxonomy to identify keywords associated with reportable topics. One problem with this approach is that manual searching generally provides search options that fail to identify emerging topic trends. Failure to identify emerging trends may undesirably escalate the trend and associated issues.

SUMMARY

According to one aspect, a topic management platform includes a model building interface coupled to a storage medium and configured to receive control input from a user to control selective retrieval of a corpus and a model from the storage medium. The topic management platform includes a machine-learning model (MLM), configured to process the corpus in accordance with the model to provide a result identifying a topic within the corpus, the topic comprised of a plurality of hierarchically organized components, the result comprising a topic map including a contribution of each of the hierarchically organized components to the topic. The topic management platform also includes a visualizer, coupled to receive the result from the MLM, the visualizer including an analysis unit, for processing the result associated with the topic to determine a contribution of each component to the topic and to other hierarchically organized components, a display comprising a plurality of visualizer windows, each visualizer window for displaying information related to components at a hierarchical level and a visualizer interface configured to accept a selection of the topic from a user and to automatically populate each of the visualizer windows with the content from different hierarchical levels.

According to another aspect, a method for topic management includes the steps of processing a corpus using a machine-learning model (MLM) configured in accordance with a training table to produce a trained model and a training result identifying a topic within the corpus, the topic comprised of a plurality of hierarchically organized components, the result comprising a topic map including a contribution of each of the hierarchically organized components to the topic. The method includes the step of processing the training result associated with the topic to determine a contribution of each component to the topic and to other hierarchically organized components and displaying a plurality of visualizer windows, each visualizer window displaying information related to components at a hierarchical level. The method additionally includes the steps of automatically populating the visualizer windows with the information related to the topic including populating different visualizer windows with component information of different hierarchical levels.

According to a further aspect, a topic management platform includes a storage device configured to store a plurality of models, a plurality of corpus and a plurality of training results. The topic management platform includes a model building interface coupled to a storage device and configured to receive control input from a user to control selective retrieval of a corpus and a model from the storage medium and a machine-learning model (MLM), configured to process the corpus in accordance with the model to provide a result identifying a plurality of topics within the corpus, each topic comprised of a plurality of hierarchically organized components, the result comprising a topic map including an entry for each topic and including a contribution of each of the hierarchically organized components to each topic. The platform further includes a visualizer, coupled to receive the result from the MLM. The visualizer includes an analysis unit for processing the result associated with the topic to determine a contribution of each component to the topic and to other hierarchically organized components, a display comprising a plurality of visualizer windows, each visualizer window configured to display information related to components of a hierarchical level and a visualizer interface configured to automatically populate each of the visualizer windows with the components from different hierarchical levels of a selected topic, wherein the visualizer is further configured to visually highlight components in accordance with their associated contribution to the selected topic.

BRIEF DESCRIPTION OF THE DRAWINGS

FIG. 4A and FIG. 4B illustrate a table of exemplary contributions to topics at respective word and document granularities;

DEFINITIONS

Figure 1:
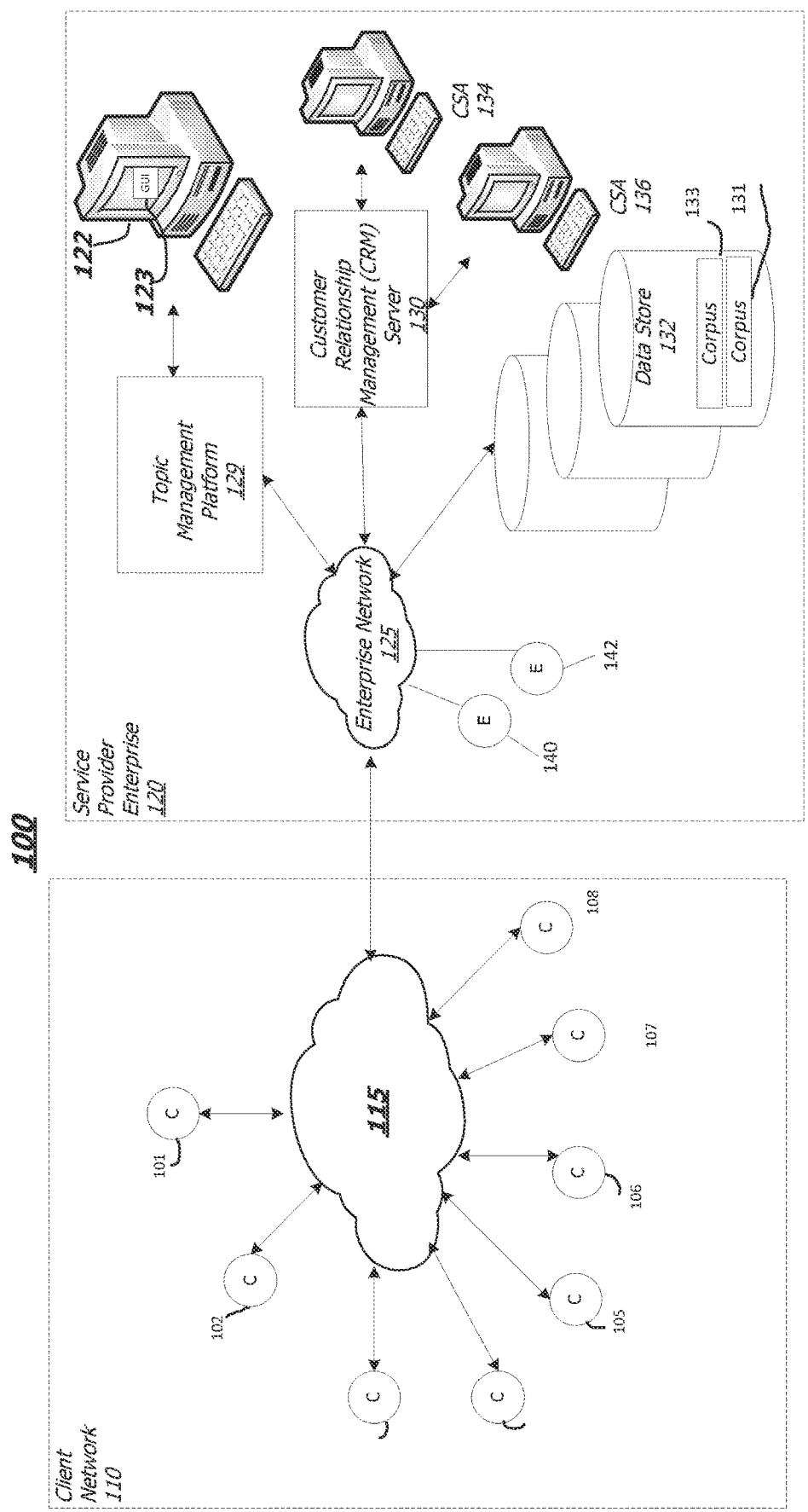
FIG. 1 is a block diagram of a system comprising one embodiment of a topic management platform configured according to aspects of the invention.

As used herein, unless specifically indicated otherwise, the word "or" is used in the inclusive sense of "and/or" and not the exclusive sense of "either/or."

Any issued U.S. Patents, allowed applications, published foreign applications, and references that are cited herein are hereby incorporated by reference to the same extent as if each was specifically and individually indicated to be incorporated by reference.

In order for the present invention to be more readily understood, certain terms are first defined below. Additional definitions are set forth throughout the specification.

Component, System, Unit: the terms "system," "component" and "unit" are intended to refer to a computer-related entity, either hardware, a combination of hardware and software, software, or software in execution, examples of which are described herein. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

Corpus means a document data structure comprising textual documents received from various sources including customer service transcriptions, web-based portals such as hotlines, email, text, social media postings, etc. Herein, a corpus comprises a collection of documents comprising a collection of words.

Document means a string of tokens, where each token is an instantiation of one of the words of the document. Each document may comprise a plurality of attributes, including a document identifier uniquely identifying the document and a word index identifying locations of words within the document.

Topic means subject of a discourse comprising one or more words distributed through a document; and Topic Model means a type of statistical model configured to identify a collection of one or more topics that occur in a collection of one or more documents.

DETAILED DESCRIPTION

Enterprise solutions for tracking topics such as customer or employee complaints or product performance issues have generally included processing large quantities of complaint information to identify complaint topics. Historically, searches performed manually by individuals across the enterprise have been inconsistently applied, and the results have been inconsistently labelled, thereby limiting the sensitivity of complaint search results by masking topic correlations. The specificity of results has also been limited because existing corpus processing solutions generally associate a single document with a single topic, obfuscating potential contributions of other word patterns within the document to other topics of interest.

According to one aspect a topic tracking platform comprises a machine-learning model that may be trained to expose topics in a corpus in response to a training table. Because topics are exposed, rather than searched for using existing taxonomies, the sensitivity of a topic tracking platform is increased, and emerging topic trends may be more quickly flagged. In one embodiment exposed topics may be automatically labelled, increasing the specificity of the topic tracking platform by overcoming the potential for topic labelling inconsistencies currently experienced in the art. According to another aspect, documents may be scored for each topic using information provided at a token granularity, and the contribution that each token of each document contributes to the topic may be calculated. In some aspects, mechanisms are provided for reviewing topics of the corpus at varying granularities, including at a topic level, document level or token level granularity. In some aspects, mechanisms are provided for visually representing the degree of contribution of documents and/or tokens to a topic.

Because the topic tracking platform considers contributions of all documents for all topics, the specificity with which corpus results may be reviewed is increased. Feedback mechanisms may further be provided to refine training of the machine-learning module to increase the accuracy of topic tracking platform results.

Processing the corpus using the trained machine-learning model may provide, in one embodiment, corpus results including a topic map that links identified corpus topics to underlying document tokens within the corpus. The corpus results may be provided to a visualization component of the topic tracking platform. The visualization component may be configured to generate statistical information for the corpus topics to a user.

The visualization component may operate in conjunction with a graphic user interface (GUI) of the topic tracking platform. In one embodiment, the GUI includes mechanisms to enable building a machine-learning model training table by applying a probabilistic model to a corpus in response to various user inputs (such as topic number, data sources, etc.) provided by a user.

The GUI may also include mechanisms for permitting a user to analyze corpus results obtained from the machine-learning model trained using a selected training table. In one embodiment, a previously generated training table may be re-used to process a corpus, where, for example, the corpus may be one captured from similar sources but at a different point in time than that used to construct the selected training table. Leveraging previously generated training tables in this manner decreases the amount of time used for topic identification while providing the ability to contextualize changes in topic volume over time to determine a correlation between a business event and changes in topic trends.

Such an arrangement may be used to evaluate the impact of intervening processes, such as remedial complaint handling steps, within the user enterprise. For example, in an embodiment having a machine-learning model trained using a corpus exposing a given complaint topic, the enterprise may make efforts to remedy the cause of the given complaint topic. The enterprise may apply a second corpus, obtained using similar input data sources, to the previously-trained machine-learning model. The ability of the machine-learning model to identify the given complaint topic may correspond to the effectiveness of the remediation efforts.

The ability to view the corpus at different component granularities permits a user to drill-down to the discrete components of a topic, thereby enabling the user to contextualize the topic results for use in validating the accuracy and the integrity of statistical results.

As will be described in more detail below, trained models may be stored for analysis of later-generated corpus, to identify changes in topic trends between corpus collected during different time periods and to correlate business events to trending topics.

These and other features of the invention will now be described with reference to the figures, wherein like reference numerals are used to refer to like elements throughout. Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of functional blocks or units that might be implemented as program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but still co-operate or interact with each other.

Various embodiments also relate to apparatus or systems for performing these operations. This apparatus may be specially constructed for the required purpose, or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

Referring now to FIG. 1, FIG. 1 is a block diagram of a system 100 including a client network 110 comprised of a plurality of clients 101-108 coupled via a network 115 to a service provider enterprise 120.

Clients 101-108 may be any client device capable of communicating with the service provider enterprise 120. The communications may originate from many sources, including but not limited to email communications, text communications, social media postings, direct messaging via enterprise communication portals (such as whistleblower sites), transcriptions of customer or employee calls, etc. According to one aspect, the client devices are configured to provide data to the service provider, where the data may include feedback data, and the feedback data may comprise complaint or other performance-related communications provided to the service provider and reduced to a textual token data stream.

Devices supporting such communications include, but are not limited to a computer device, or communications device including, e.g., a server, a network appliance, a personal computer (PC), a workstation, a mobile device, a phone, a handheld PC, a personal digital assistant (PDA), a thin client device, a fat client device, an Internet browser, or other device. Clients 101-108 also may be a mobile device; for example, a mobile device may include an iPhone, iPod, iPad from Apple® or any other mobile device running Apple's iOS operating system, any device running Microsoft's Windows® Mobile operating system, and/or any other smartphone or like wearable mobile device.

In some examples, network 115 may be one or more of a wireless network, a wired network or any combination of wireless network and wired network and may be configured to connect customers in client network 110 to service provider enterprise 120. For example, network 115 may include one or more of a fiber optics network, a passive optical network, a cable network, an Internet network, a satellite network, a wireless local area network ("LAN"), a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, Bluetooth, Near Field Communication (NFC), Radio Frequency Identification (RFID), Wi-Fi, and/or the like.

In addition, network 115 may include, without limitation, telephone lines, fiber optics, IEEE Ethernet 902.3, a wide area network ("WAN"), a wireless personal area network ("WPAN"), a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices.

Service provider enterprise 120 includes resources of a service provider, where a service provider is a company that provides one or more of products and services to customers. In some embodiments, a service provider includes a topic management platform 129 for tracking and analyzing enterprise communications to expose topic trends. The topic tracking servers may use resources that are owned and dedicated specifically to the enterprise, and/or those licensed or leveraged as part of third-party arrangements, such as cloud-based services, applications, and resources. A workstation 122 may be communicatively coupled to the topic management platform 129, where the workstation may include a graphic user interface 123 comprising control mechanisms enabling a user at the workstation to monitor and more quickly remediate enterprise performance issues exposed by the enterprise communications.

In one embodiment, the enterprise communications may comprise communications received from particular sources including complaint sources such as a customer relationship management (CRM) server 130 and customer service agent(s) (CSAs) 134, 136. In some embodiments, a service provider may be an enterprise that provides numerous products and services to clients and includes resources for collecting client feedback received from a variety of sources. In one aspect, the service provider further comprises resources for collecting feedback from employees, such as employee(s) 140, 142. Other use cases for the topic management platform will be discussed in more detail below, and may include management of any regulatory reporting feedback, evaluation of marketing campaign efficacy, and early warning systems to quickly identify emerging enterprise issues.

The service provider may include an enterprise network 125 that secures communication between interconnected service provider resources. Like network 115, the enterprise network 125 may comprise wireless or wireline communication or combination technology and may use protocols such as those of network 115.

Service provider enterprise 120 further comprises data store 132 that may be used, for example, to store one or more corpora such as corpus 131 and corpus 133, each collected over a pre-determined time period, wherein in one embodiment the corpus comprises a collection of documents, and the documents comprise a collection of words. The data store 132 may be comprised of coupled data resources comprising any combination of local storage, distributed data center storage or cloud-based storage. According to one embodiment, the data store supports full-text indexing.

Figure 2:
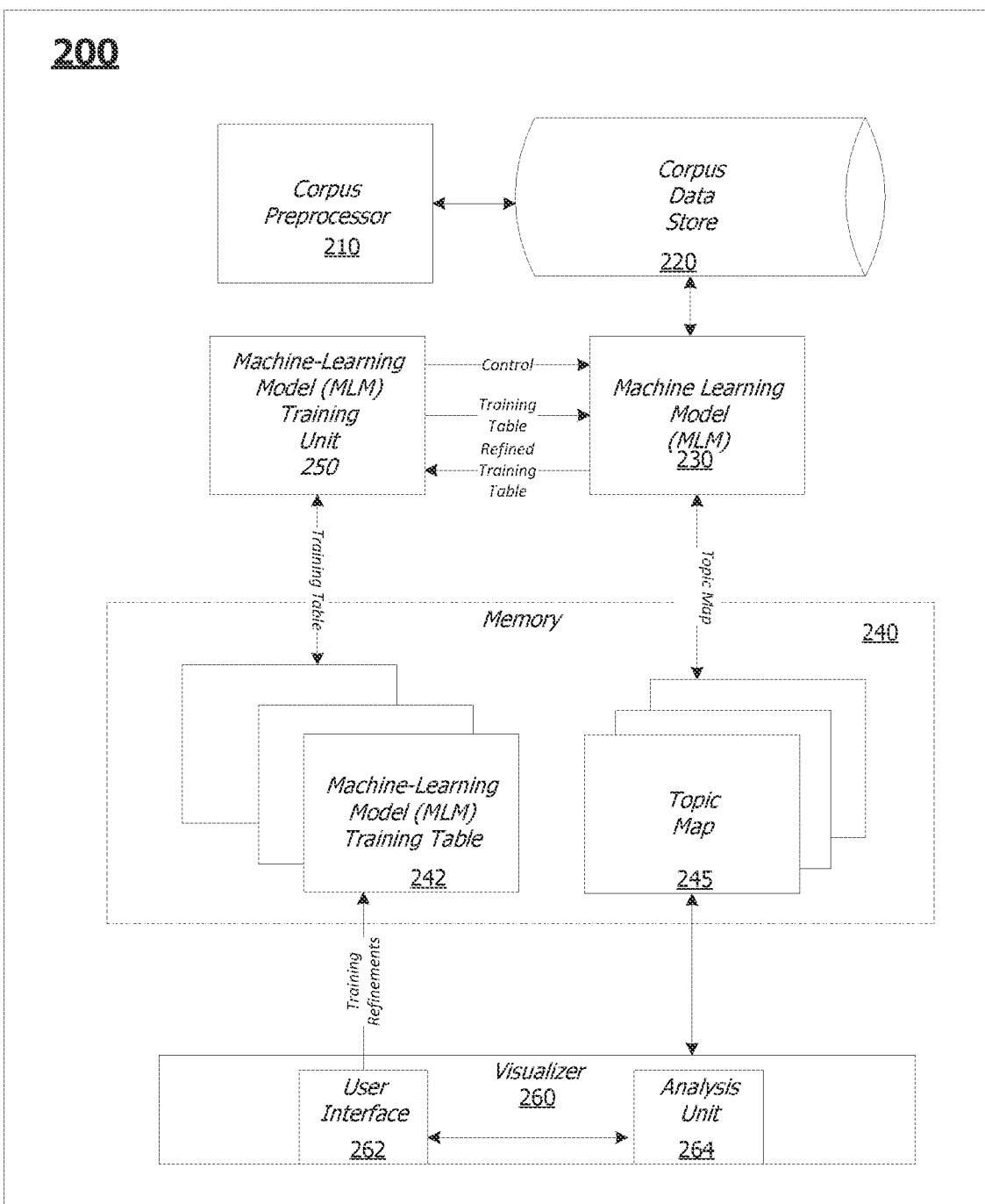
FIG. 2 is a block diagram of exemplary components of one embodiment of the topic management platform of FIG. 1.

FIG. 2 is a block diagram of exemplary components of a topic tracking platform 200. In one embodiment the topic tracking platform 200 is comprised of a combination of hardware and software resources of the enterprise which are configured to provide tools for: building one or more topic models, analyzing corpus data using the one or more topic models to expose corpus topics, generating and visually representing statistical information for the corpus, permitting drill-down into corpus topic components, refining topic models and maintaining and displaying event streams which may be used to correlate enterprise events with trending corpus topics to monitor enterprise performance.

Exemplary components of one embodiment of a topic tracking platform 200 are shown to include a corpus data store 220, a corpus preprocessor 210, a machine learning model (MLM) 230 and a machine learning model (MLM) training unit 250. The MLM training unit 250 is coupled to store one or more versions of a Machine-Learning Model (MLM) training table 242 in memory 240. Memory 240 may also store one or more topic maps, such as topic map 245, where each topic map is associated with the processing of a particular corpus/training table pair.

According to one aspect, the corpus data store 220 is a data store having full text-based searching capabilities, may reside on a resource owned or licensed by the enterprise service provider and may be configured to receive documents from a plurality of different sources. Each document may comprise a string of tokens, where each token is associated with one instantiation of one of the words of the document. Associated with each document may be document information including but not limited to a document name, a document source, number of tokens, a number of words, a word index identifying the location of the word in the document, a word frequency, etc.

According to one aspect, the document information is utilized by the MLM 230 to expose corpus topics through the iterative application of a probabilistic model to the corpus contents as will be described in more detail below. The output of the MLM 230 comprises an MLM training table 242, reflecting the determined relationship between word patterns and topics, as well as a topic map 245 including information related to components of each corpus topic.

For example, in one embodiment each word of the document is scored to reflect its degree of contribution to a particular topic, and the scoring information may be used to hierarchically navigate through a corpus to more easily understand topic context.

Figure 5:
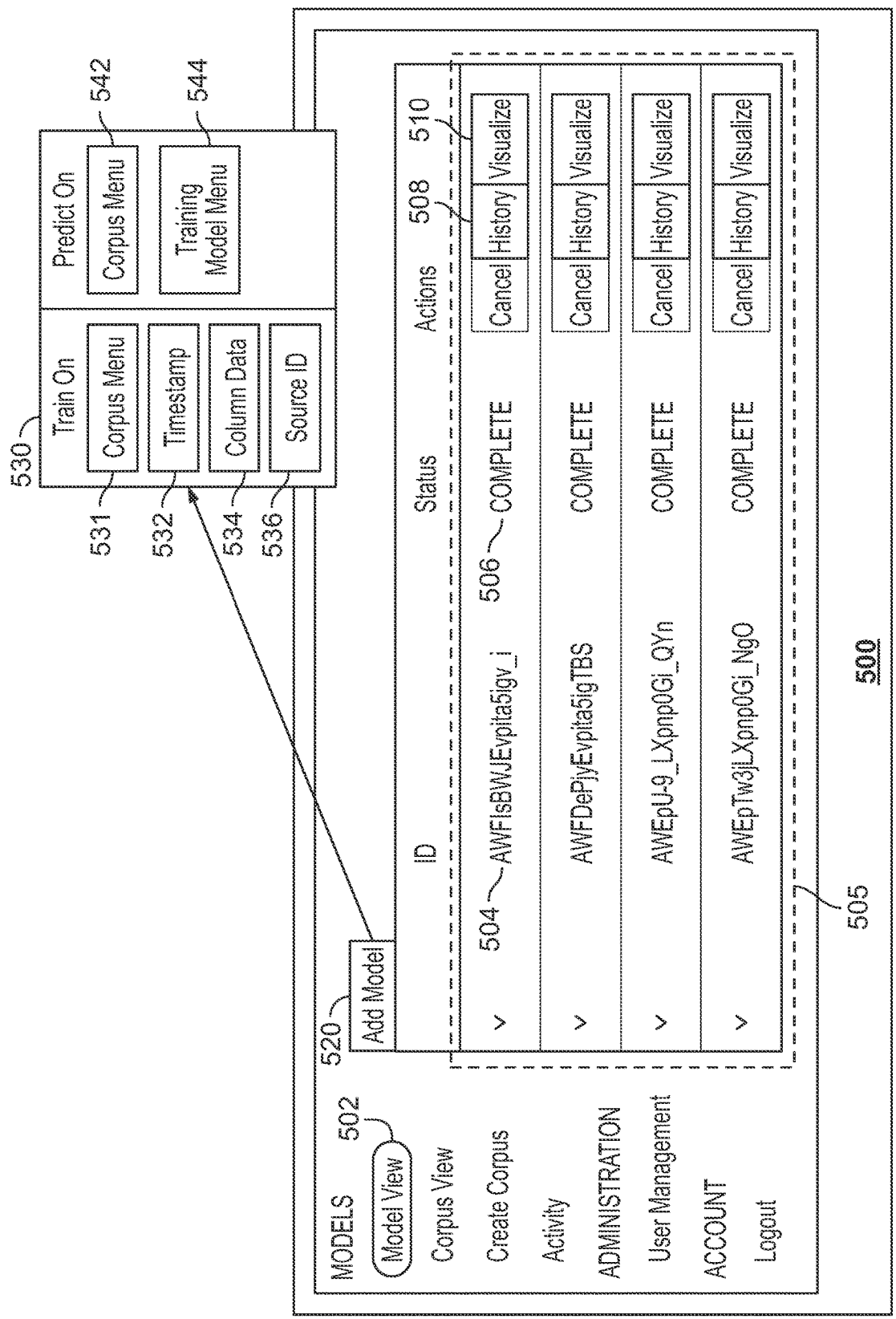
FIG. 5 is an exemplary landing page of a topic management platform that may be used to control the training of machine-learning models as described in FIG. 3.

The topic tracking platform 200 is also shown to include a visualizer 260 comprising a user interface 262 and an analysis unit 264. As will be described in more detail below, the visualizer enables a user to control various operations of the topic tracking platform, for example by building topic models of different granularities (including at a topic level, document level or token level granularity), applying topic models to the different corpora, providing feedback to refine training models and controlling topic labelling. As described with more detail in FIG. 6, analysis unit 264 may work cooperatively with the user interface 262 to process topic information received in response to user input (for example, as shown in FIG. 5), to generate visual displays highlighting various topics of interest that are linked to underlying corpora. The visualizer further enables a user to simultaneously visualize corpus topic information from a variety of different perspectives and generated by a variety of different sources to highlight correlated enterprise events.

Figure 3:
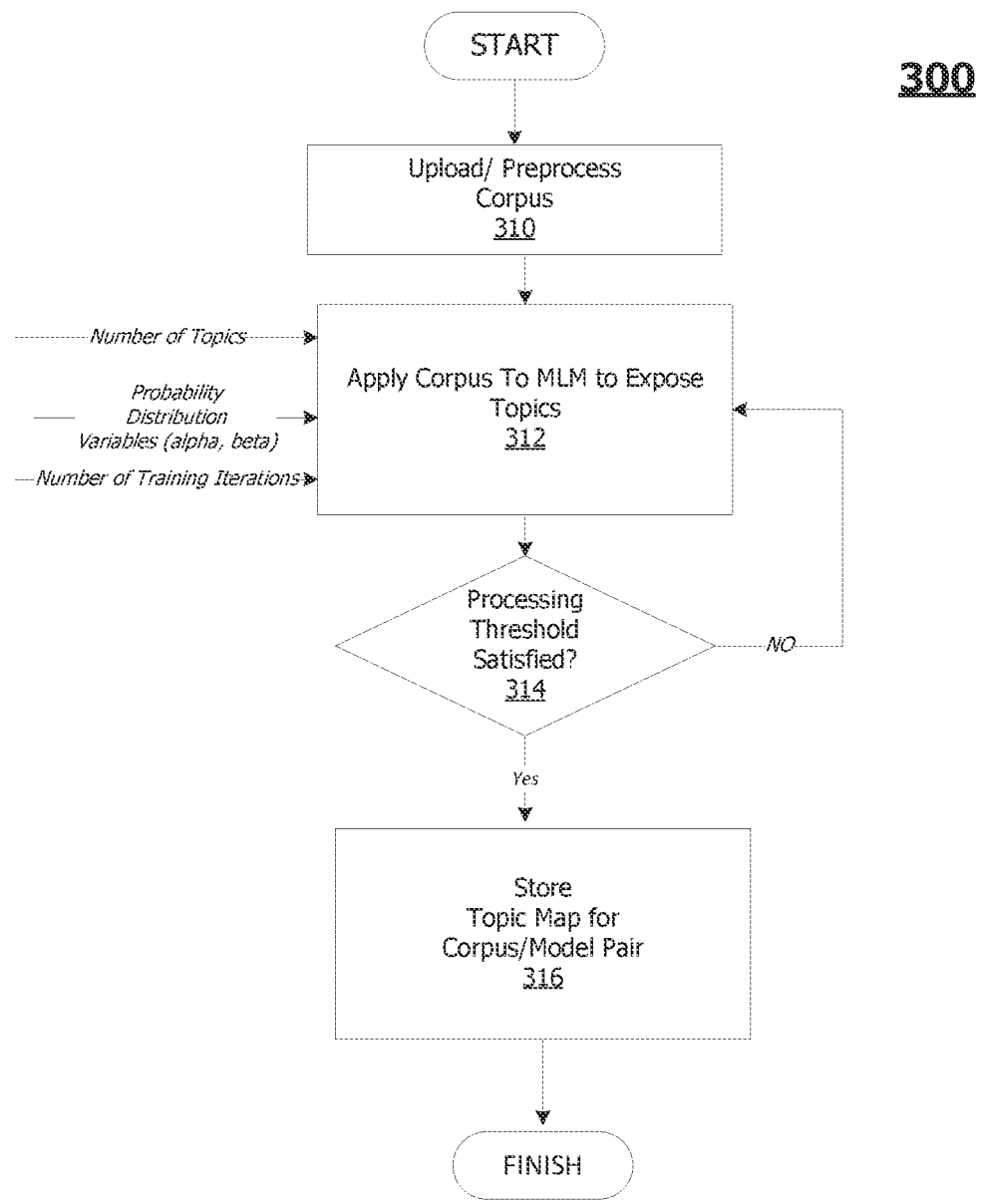
FIG. 3 is a data flow diagram illustrating exemplary steps that may be performed by a topic management platform of FIG. 2 to train a machine-learning model (MLM) for use by the topic management platform of FIG. 1.

FIG. 3 illustrates exemplary steps that may be performed in a process 300 for training a machine-learning model for use by the topic tracking platform 200.

Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Machine-learning models can be constructed through an at least partially automated (i.e., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule.

According to one aspect, machine-learning models used herein may include one or more methods for topic modeling. These methods may include, but are not limited to, general probabilistic analyses including Dynamic Topic Modeling (DTM), Correlated Topic Models (CTM), Topics over Time (ToT) approaches a Latent Dirichlet Allocation (LDA), a Latent Semantic Analysis (LSA), a probabilistic latent semantic analysis, a Nonnegative Matrix Factorization (NMF) and a Hierarchical Dirichlet process (HDP). Methods for performing topic modeling using these techniques are disclosed in these references, incorporated herein by reference: D. M. Blei, A. Y. Ng, and M. I. Jordan. *Latent Dirichlet allocation*. JMLR, 3:993-1022, 2003, eh, Y. W.; Jordan, M. I.; Beal, M. J.; Blei, D. M. (2006). "Hierarchical Dirichlet Processes" (PDF). *Journal of the American Statistical Association*. 101: pp. 1566-1581, David M; Lafferty, John D (2006). *Dynamic topic models*. Proceedings of the ICML. CML'06. Pp. 113-120, Wang, Xuerui, McCallum, Andrew, *Topics over Time: A Non-Markov, Continuous-Time Model of Topic Trends*, Proceedings of the 12th ACM SIGKDD International Conference on Knowledge Discovery and Data Mining Pages 424-433.

At step 310, a corpus is uploaded and preprocessed. In one embodiment, the corpus is a collection of documents selected from a superset of documents according to search criteria of a user. The selection process may be based upon any parameter or document tag including but not limited to a document source, a document line of business association, a document product association, a document priority, a document timestamp, etc.

Preprocessing may be performed on the corpus to resolve misspellings, map words to their lemmas (canonical linguistic form stripped of morphological variations), exclude very common words (i.e., stop words), etc. The processed corpus is then stored in a document database that supports full-text indexing. In one aspect, full-text support enables users to explore corpora or topics by Boolean searches on keywords. A corpus can be preprocessed in multiple ways, and once preprocessed using a particular preprocessor and stored in the document database, it is available for later use for topic evaluation without the need to be preprocessed again.

At step 312 the corpus is applied to the machine-learning model to expose topics. A user may select a number of topics to be provided as a corpus result, with a larger number of topics providing corpus results of higher granularity.

The MLM is iteratively trained/fit onto the corpus until it is determined that a processing threshold is reached at step 314. The processing threshold may be, for example, a pre-identified number of iterations. Alternatively, processing may continue until a topic distribution of the resulting corpus conforms to a desired distribution profile.

There are various inference methods for fitting a topic model to a distribution profile, any of which may be utilized herein. Each of these has its own notions of "stopping criterion," including thresholding goodness of fit measures, setting some number of iterations, etc. For example, determining when to stop inference for one method called Gibbs Sampling can be done by computing two convergence criteria, for example R_hat (aka the potential scale reduction factor) and effective sample size (ESS). When R_hat is close to 1 and the ESS reaches a desired size (e.g. 1000 effective samples), inference may be complete. Another common inference technique called EM (expectation maximization) uses standard optimization techniques, attempting to make improvement at each iteration and stopping when none is achieved. This can be detected when the parameters of the model do not change between subsequent training iterations.

In addition, most topic modeling techniques require explicitly setting the number of topics (usually called K) as a parameter (nonparametric methods like HDP discover the correct number of topics automatically), and subsequently tuning the parameter to increase it or decrease it by executing a held out set of documents against the model to determine whether a held out, later applied, set of documents provides the desired topic results. According to one aspect, models with better settings of K will have a higher likelihood of identifying topics within the held-out data set. Topic models which have higher likelihood are considered to have fit the data better. It is appreciated that topic models with too few topics may lack the expressive power to encode an accurate representation of the documents it observes, and new documents will be considered less probable due to an insufficient number of topics and may be unable to capture the nuance of what's being discussed in the corpus.

At step 316 corpus results including a topic map may be stored following a determination at step 314 that the desired number of iterations of corpus processing has been achieved. According to one aspect, the topic map comprises, for each word in the corpus, a contribution value of the word to the topic. For example, FIG. 4A illustrates an exemplary map 400 of words within a document to topics (Topic1 402 and Topic2 404), including the contribution value 406 provided by a word to the total topic contribution for the document. FIG. 4B illustrates a second table that comprises, for each of the documents of the corpus, the relative distribution of words per topic per document, where the relative distribution may be determined by summing the contribution value 406 of each word of the document for each topic.

FIG. 5 illustrates an exemplary landing page 500 of a graphical user interface (GUI) that may be provided by the topic management platform in some embodiments when selecting or building a topic model. The landing page may include a list 505 of trained models which may be viewed by selecting a model view option 502. For the purposes of this specification, 'a trained model' refers to the MLM output resulting from the application of the MLM to a corpus and includes a training table comprising the final probabilistic results obtained from processing a previous corpus.

Each entry of the list 505 may include information related to a trained model, including a model identifier 504 and a training status indicator 506. The landing page 500 may also include buttons allowing a user to control aspects of the trained model, including a button 508 for viewing a history of the trained model and a button 510 enabling visualization of the corpus results from the most recent execution of the model. Viewing the history of the trained model enables the user to track which corpus has been used to train the model over time.

In some embodiments, users may retain point-in-time versions of models and may also retain other versions of the model that are more frequently refined based upon corpus received from current events. The point-in-time model may be considered a 'Champion' model representing a baseline topic behavior profile for the enterprise at that given point in time. The more frequently updated models reflect a more current point in time topic profile for an enterprise and may be considered a 'Challenger' model. According to one aspect, as will be described in more detail below, the visualizer may be used to visually compare the challenger model corpus result to the champion model corpus result to expose new topic trends within the enterprise. In one embodiment, the history button, when selected, displays to the user a training history for the model associated with the model identifier 504.

The landing page 500 also includes an 'add model' button 520 enabling a user to add a trained model. Selection of the 'add model' button 520 may result in a launch of training control sub-window 530, which allows a user to either add a trained model by applying a new corpus to an initialized machine-learning model ("Train On"), or to add a trained model by applying a new corpus to an existing trained model ("Predict On").

For example, corpus menus 531, 542 permit selection of a corpus from a data store. Initial filters may be applied to the corpus depending upon the purpose of the analysis, for example controlling access to data within one or more a corpus based on a timestamp 532, particular column data 534 and/or a source identifier (ID) 536. Other filter options may include a product filter, a business line filter or other filters to produce a desired cross sections of corpus information. The present invention is not limited to any particular method of pre-filtering of the corpus. For building models using existing training models, for example, to build a challenger model from a champion model using new corpus data, the user may select a training model from training model menu 544.

Once a training model and corpus have been selected, training of the model begins. Training status indicator 506 indicates 'Complete' when the training is complete as described in FIG. 3, and the user may select button 510 to launch the visualizer.

Figure 6:
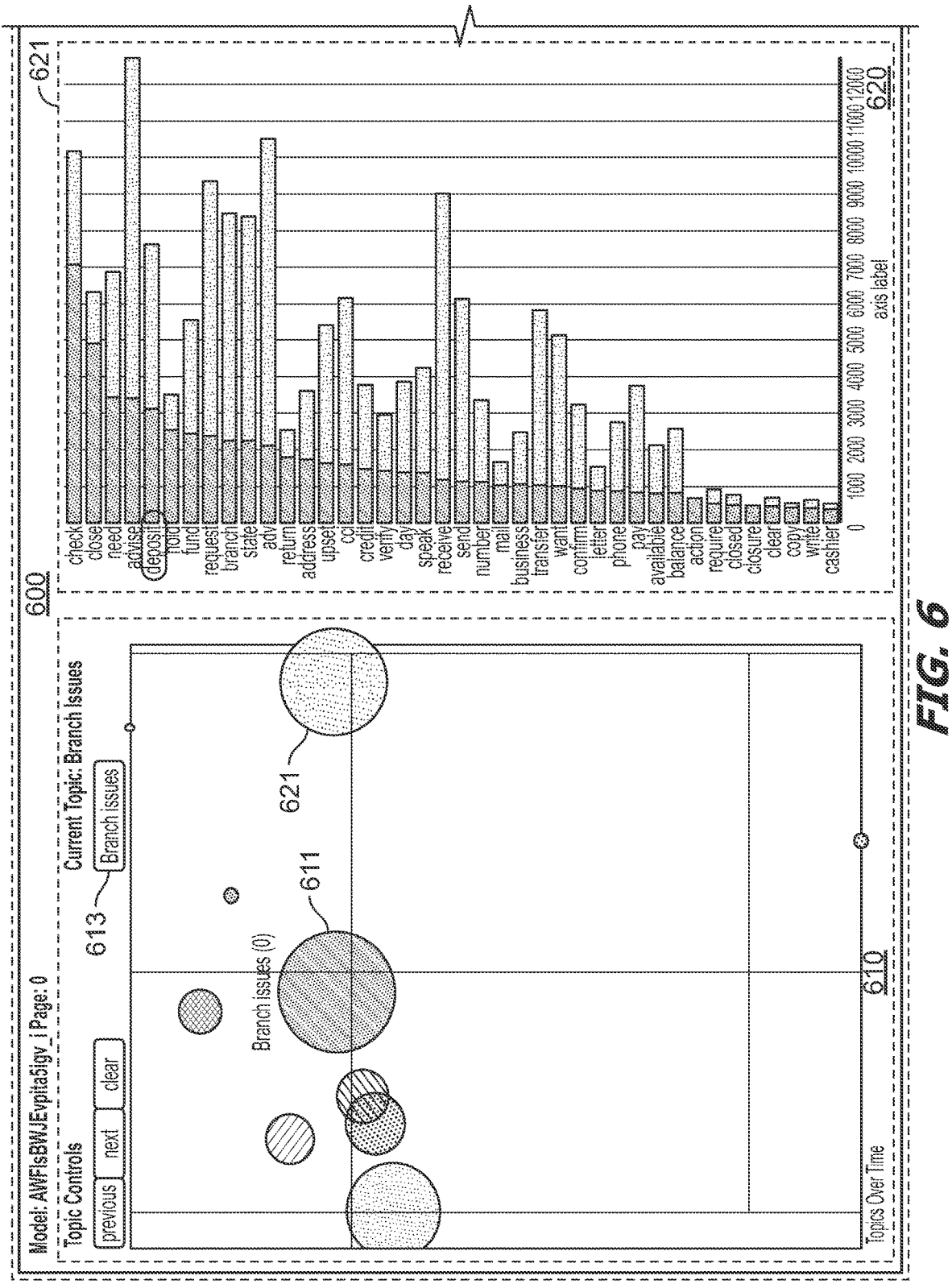
FIG. 6 an exemplary embodiment of a landing page of a visualizer of the topic management platform of FIG. 2.
Figure 6:
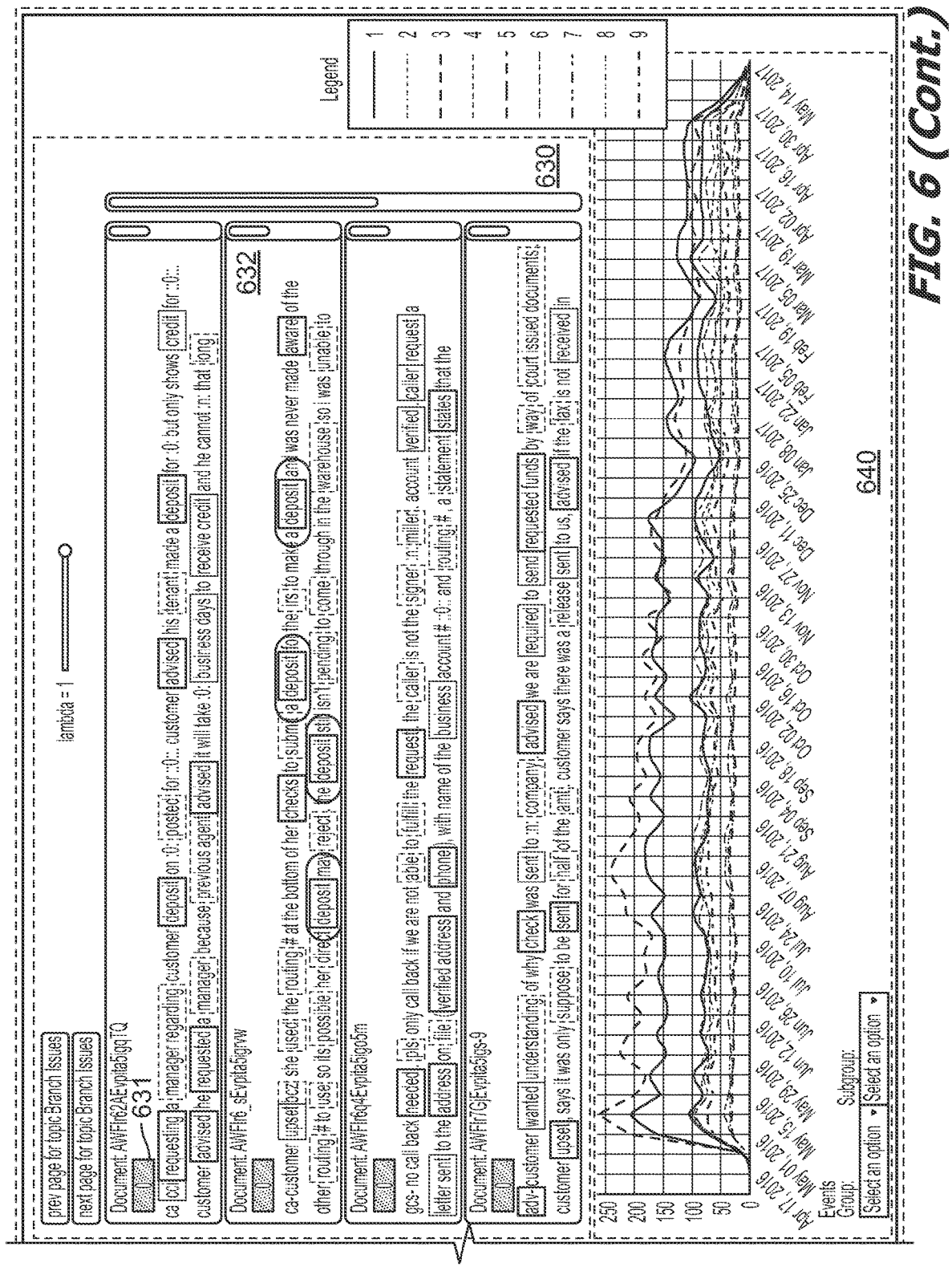

FIG. 6 is a diagram illustrating an exemplary embodiment of a landing page 600 of a visualizer service provided by the topic management platform. In one embodiment the visualizer allows corpus review from a variety of different hierarchical perspectives, displaying information at a variety of different granularities, and over a variety of different time frames.

For example, the landing page 600 is shown to include in one embodiment an intertopic distance map 610, a topic interpretation chart 620 and a document scroll 630, each of which displays corpus results at different hierarchical granularities. For example, from a corpus granularity, the intertopic distance map 610 highlights identified topics in the corpus, the topic interpretation chart 620 enables viewing of corpora data by topic prevalence, and the document scroll 630 enables drill down from topic data to the underlying corpora.

Examples of a library of functions, techniques and methods supporting topic model visualization for generating a display windows (intertopic distance map 610, topic interpretation chart 620 and document scroll 630) such as those shown in FIG. 6 includes the python library for interactive topic modeling disclosed at https://github.com/bmabey/pyLDAvis and incorporated herein by reference. Other methods for visualizing and interpreting topics which may be included or substituted with those provided by the python library are disclosed in the paper entitled *LDAvis: A Method for visualizing and interpreting topics* by Sievert et al, from *Proceedings of the Workshop on Interactive Language, Learning, Visualization and Interfaces*, pages 63-70, Baltimore Md., USA, Jun. 27, 2014.

The topic interpretation chart 620 evaluates information from a particular topic at word granularity, displaying the contribution of words to a selected topic. Document scroll 630, which includes excerpts of documents of the corpus that include words from the topic interpretation chart, enabling a user to quickly gain context regarding topics, and to use such context to selectively modify a topic label. Accordingly, the visualizer provides a mechanism for navigating through a variety of hierarchically organized topic data, thereby facilitating comprehension of underlying issues related to topic trends.

The intertopic distance map, in one embodiment, comprises bubbles sized and spaced in accordance with topic prevalence within the corpus. In the example embodiment of FIG. 6, the 'branch issue' topic, sized largest, is most prevalent within the corpus. Topic 621, while also prevalent within the corpora (as indicated by its size), is shown spaced apart from topic 611, representing the lack of correlation between the topics within the corpora. According to one aspect, selection of a topic bubble such as topic bubble 611 results in automatic population of a topic label field 613. In one embodiment, the topic label is selected by the Machine Learning Model as part of generation of the topic map using natural language inference methods. In an alternate embodiment, a suggested topic label populated by the MLM in the topic label field 613 may be overridden by the user if desired following review of topic components via drill-down support tools such as topic interpretation chart 620 and document scroll 630. In other embodiments, the topic labels may be proposed and voted on by users with the goal of choosing a label that most subject matter experts agree represents the dominant theme or themes in the documents.

Topic interpretation chart 620 may include a list of words contributing to the topic. In FIG. 6, the contribution is illustrated by way of a bar chart 621 that displays the frequency and/or contribution of words within the corpus to a selected topic. According to one aspect, the contents of the topic interpretation chart is dynamically updated in response to the user selection of a topic from the intertopic distance map. For example, bar chart 621 is updated to display topic components for a selected branch issues topic bubble 611. Visual cues may be provided to assist user comprehension of corpus results, including, for example, color coding and shading topics for consistent topic visualization across windows. For example, in FIG. 6, topic 611 is associated with a consistent color throughout the display, such that information related to this topic is presented in the same color in windows 610, 620 and 630. For example, bar chart 621 is the same color as the selected topic bubble 611, is used to highlight relevant document 631 within the corpora and is used to graph topic trend over time 641.

In one aspect, the landing page 600 may also include a document scroll 630 comprising portions of documents of the corpus determined to contribute to the topic. In some embodiments components of topics may be shaded in accordance with their degree of contribution to a topic; i.e., words within a document that are determined to be statistically relevant to the underlying topic may be displayed as shaded text, with shading varying in accordance with the determined relevancy (i.e., brighter text may be more relevant than muted text) to visually assist the user's ability to grasp the context of a topic and relevancy of the word to the topic. An example of such a feature is shown in document scroll 632, which highlights the term 'deposit,' a word shown in window in bar chart 621 to be statistically relevant to the topic 611.

The ability to easily navigate through topic components and to obtain statistical perspectives at different granularities enables a user to get a more comprehensive understanding of topic trends, which leads to early issue identification and remediation.

Additional context may be provided by comparing and contrasting topics over time and/or in the context of business events. Window 640 is an exemplary representation of topic trends over time. The trends may be associated with corpus obtained from similar sources, to evaluate the impact of external events on the topics over time. The trends may alternatively be associated with corpus obtained from different sources, over time, to identify correlations between inter-business activity. In window 640, each point of each line of the graph is associated with topic probabilities obtained at the respective point in time of the x-axis. In some aspects, the point in time probabilities of a topic may be referred to as an 'event stream.' Viewing corpus results from an event stream perspective highlights inter-topic dependency. Window 640 includes a set of event annotations such as a change of policy, business logic, data source, external context, etc. The event annotations provide a visual correlation between a change in topic volume and potentially contributing causes. Event annotations can be revealed and filtered by group or subgroup using the dropdown menu.

In one embodiment, the visualizer may be used to track topics across lines of business application of a trained model to corpora sourced from different lines of business. Historically, cross-business complaints were determined on the back-end by mere combination and comparison of business line complaints. Such a review process may fail to expose new complaint trends that cross business lines but are not occurring in an amount that would independently give the business pause. Comparison of event streams from the different corpus results from the different lines of business may assist in surfacing new topics.

Figure 7:
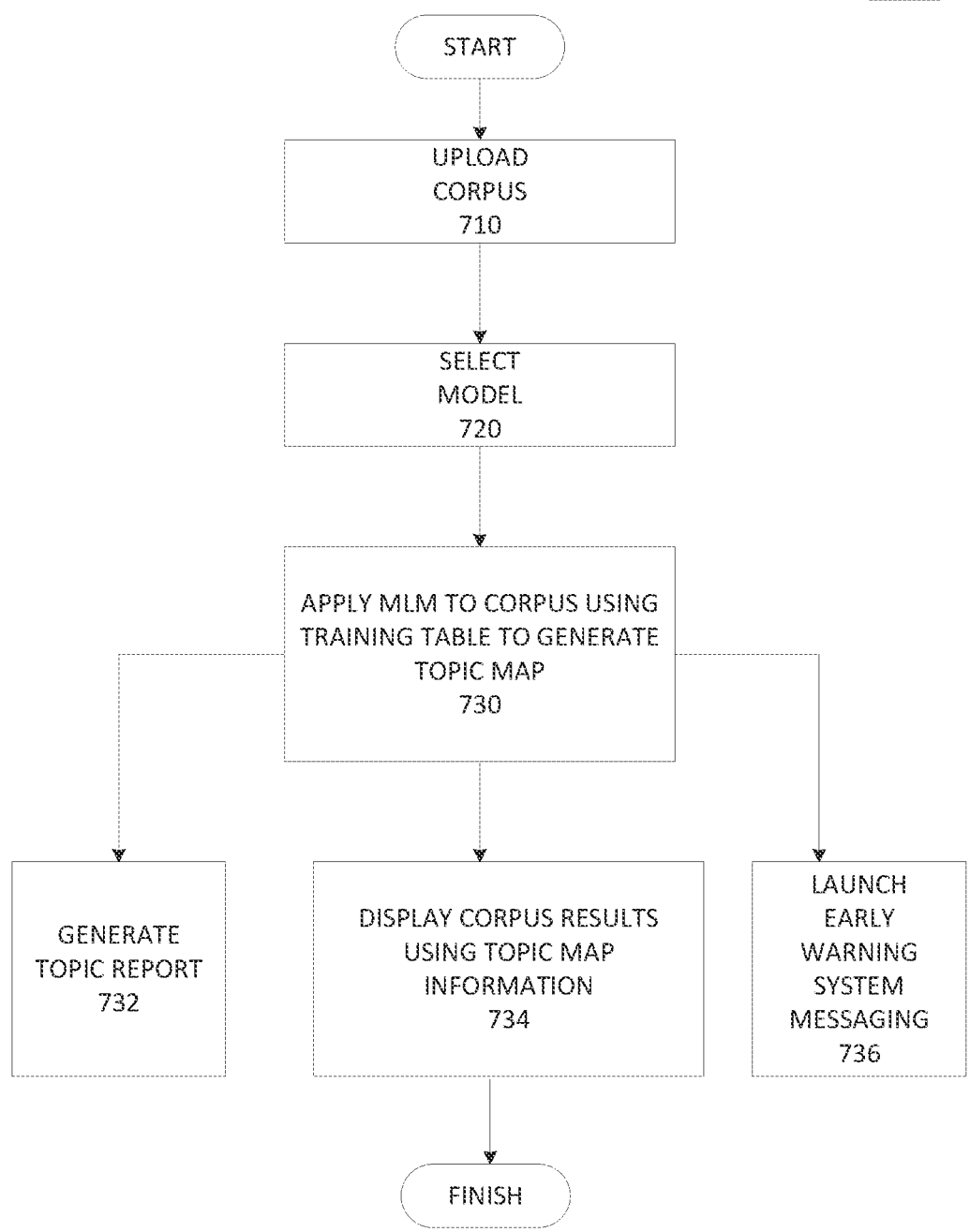
FIG. 7 is flow diagram illustrating exemplary steps that may be performed by the test platform to evaluate enterprise performance.

FIG. 7 is an exemplary flow diagram illustrating a general information flow 700 for the topic management platform. In one embodiment, the topic management platform may be made available across lines of business in an enterprise, each user of the topic management platform referred to herein as a 'tenant'. In some embodiments, access to topic model and different corpus sources by tenants may be selectively controlled according to a predefined security profile. Tenants may use the topic management platform for different purposes, as described in more detail below.

As described previously, when a tenant seeks to use the topic management platform, at step 710 a corpus is uploaded, at step 720 a model is selected (either a pre-existing model or an initialized model), and at step 730 the MLM processes the corpus according to the training table of the selected model, providing corpus results including a topic map. As mentioned above, a user may subsequently launch the visualizer to review the topic components from a variety of different granular perspectives at step 734. In some embodiments, the model may configure the MLM to generate topic reports 732, such as periodic compliance reports. In some embodiments, the corpus results and topic map are saved, for later use and access and review using visualizer components of the topic management platform.

In some embodiments, functions of the topic management platform may be automated. For example, a model may be trained to proactively and periodically pull corpus data from sources, process the pulled corpus data to produce pulled corpus results, and compare the pulled corpus results to previous corpus results to provide an early warning system for newly trending topics. Early Warning Messaging may be launched in response to such an analysis at step 736. This same functionality may also be used to send messages indicating when a previously identified topic "dies out." In other words, when documents stop appearing that are representative of that topic. For example, when topic modeling is used to track complaint trends, diminished receipt of certain complaints may indicate that a particular sequence of complaints have been addressed at the root cause, such that customers are no longer complaining about issues of that nature.

The disclosed topic management platform may be used in a variety of scenarios. In one embodiment, the topic management platform may be used to generate topic models for tracking complaints, including one or more of employee or customer complaints. In such a use case, the topic management platform may be used to collect topic data for corporate governance reporting purposes, for regulatory reporting purposes or for other business purposes. The topic management platform may also be used to track the launch of a particular product or the efficacy of a marketing campaign. In short, the present invention is not limited to any use case, but rather may be used to contextualize enterprise feedback.

Accordingly, a system and method for topic management provides a mechanism for building one or more topic models, analyzing corpus data using the one or more topic models to expose corpus topics, generating and visually representing statistical information for the corpus, permitting drill-down into corpus topic components, refining topic models and maintaining and displaying event streams which may be used to correlate enterprise events with trending corpus topics to monitor enterprise performance.

Some embodiments may be described using the expression "one embodiment" or "an embodiment" along with their derivatives. These terms mean that a particular feature, structure, or characteristic described in connection with the embodiment may be included in an exemplary implementation. The appearances of the phrase "in one embodiment" in various places in the specification are not necessarily all referring to the same embodiment. Moreover, unless otherwise noted the features described above are recognized to be used together in any combination. Thus, any features discussed separately may be employed in combination with each other unless it is noted that the features are incompatible with each other.

With general reference to notations and nomenclature used herein, the detailed descriptions herein may be presented in terms of functional blocks or units that might be implemented as program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," howaever, may also mean that two or more elements are not in direct contact with each other, but still co-operate or interact with each other.

Various embodiments also relate to apparatus or systems for performing these operations. This apparatus may be specially constructed for the required purpose, or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single embodiment to streamline the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A topic management platform comprising:
   a processor;
   a storage device having program code stored thereon, the program code operable when executed upon by the processor to:
   retrieve a corpus and a model from the storage device;
   process the corpus using machine-learning model (MLM) program code, to identify a topic within the corpus, the topic comprised of a plurality of hierarchically organized components;
   determine contributions for a plurality of hierarchically organized components to the topic, wherein each contribution corresponds to one of the hierarchically organized components, and each contribution indicates a frequency one of the plurality of hierarchically organized components contributes to the topic; and
   the program code further comprising visualizer program code operable, when executed upon by the processor, to display, in a plurality of hierarchically linked visualizer windows and child visualizer windows, information related to the plurality of hierarchically organized components at a hierarchical level based on the contributions indicating the frequencies for the plurality of hierarchically organized components contribute to the topic, wherein the plurality of hierarchically organized components are displayed in an order based on the frequencies for the topics in one of the plurality of hierarchically linked visualizer windows and contents of at least one of the child visualizer windows are automatically updated in response to selection of one of the hierarchically organized components in the one of the plurality of hierarchically linked visualizer windows, wherein the plurality of hierarchically linked visualizer windows and the child visualizer windows are displayed concurrently.

2. The topic management platform of claim 1 wherein the corpus may be processed by the MLM program code to identify a number of topics in the corpus, and a control input received at a user interface includes the number of topics.

3. The topic management platform of claim 1 wherein the model is selected from a plurality of models stored in the storage device, and the plurality of models are trained using a plurality of different corpora.

4. The topic management platform of claim 3 wherein the plurality of different corpora comprise corpora captured from different time periods, different sources, or a combination thereof.

5. The topic management platform of claim 1 wherein the hierarchically organized components include a suggested topic label.

6. The topic management platform of claim 5 wherein the visualizer program code is further operable to display the suggested topic label on a display device, and to modify the suggested topic label in response to user input.

7. The topic management platform of claim 1 wherein the visualizer program code is further operable to visually highlight hierarchically organized components in accordance with their associated contribution.

8. The topic management platform of claim 1 wherein the MLM program code includes one or more of a Dynamic Topic Modeling (DTM), Correlated Topic Models (CTM) and Topics over Time analyses.

9. The topic management platform of claim 1 wherein the machine-learning model program code is trained using one or more of a Latent Dirichlet Allocation (LDA), a Latent Semantic Analysis (LSA), a probabilistic latent semantic analysis, a Nonnegative Matrix Factorization (NMF) or a Hierarchical Dirichlet Process (HDP).

10. A method for topic management includes the steps of:
processing a corpus using a machine-learning model (MLM) configured in accordance with a training table to produce a trained model and a training result identifying a topic within the corpus, the topic comprised of a plurality of hierarchically organized components, the result comprising a topic map including a contribution of each of the hierarchically organized components to the topic;
processing the training result associated with the topic to determine a contribution of each hierarchically organized component to the topic and to other hierarchically organized components each contribution indicates a frequency the one of the plurality of hierarchically organized components contributes to the topic;
displaying a plurality of visualizer windows, each visualizer window displaying information related to the hierarchically organized components at a hierarchical level; and
automatically populating the visualizer windows with the information related to the topic including populating different visualizer windows with component information of different hierarchical levels, wherein a first visualizer window of the visualizer windows configured to present the hierarchically organized components for the topics in an order based on each contribution, and wherein a second visualizer window is linked with the first visualizer window and is updated with data in response to a selection of one of the hierarchical organized components in the first visualizer window, and the first visualizer window and the second visualizer window are displayed concurrently.

11. The method of claim 10 including processing the corpus such that the training result comprises a plurality of topics and wherein the step of displaying operates in response to a selected topic of the plurality of topics to display hierarchical content associated with the selected topic.

12. The method of claim 11 including the step of selecting the MLM from a plurality of MLM's, each MLM trained using a different corpus comprised of text data captured from one or different sources and different time periods.

13. The method of claim 12 including processing a plurality of corpus captured at different points in time using the MLM to build an event stream and displaying the event stream for each of the plurality of topics.

14. The method of claim 10 wherein the hierarchically organized components include a suggested topic label, and the method includes the steps of displaying the suggested topic label to a user and modifying the suggested topic label in response to user input.

15. The method of claim 10 wherein the machine-learning model is trained using one or more of a Dynamic Topic Modeling (DTM), Correlated Topic Models (CTM) and Topics over Time analyses including one or more of a Latent Dirichlet Allocation (LDA), a Latent Semantic Analysis (LSA), a probabilistic latent semantic analysis, a Nonnegative Matrix Factorization (NMF) or a Hierarchical Dirichlet Process (HDP).

16. The method of claim 10 including the step of highlighting particular hierarchically organized components within the visualizer windows in accordance with a contribution of the component to the topic at a displayed hierarchical level.

17. A topic management platform comprising:
a storage device configured to store a plurality of models, a plurality of corpus and a plurality of training results;
a processor, coupled to the storage device;
model building program code, stored in the storage device and operable, when executed upon by the processor and based upon input from a user to control selective retrieval of a corpus and a model from the storage device;
machine-learning model (MLM) program code, stored in storage device and operable when executed upon by the processor to process the corpus in accordance with the model to provide a result identifying a plurality of topics within the corpus, each topic comprised of a plurality of hierarchically organized components, the result comprising a topic map including an entry for each topic and including a contribution of each of the hierarchically organized components to each topic, wherein each contribution indicates a frequency each of the hierarchically organized components contributes to each topic;
visualizer program code, stored in the storage device and operable when executed upon by the processor to:
analyze the result associated with a selected topic to determine a contribution of each hierarchically organized component to the selected topic and to other hierarchically organized components;
display a plurality of visualizer windows on a display device, each visualizer window configured to display information related to components of a hierarchical level;
automatically populate a visualizer window with the hierarchically organized components of the selected topic in an order based on the frequencies of the topics, wherein the visualizer window is further configured to visually highlight hierarchically organized components in accordance with their associated contribution to the selected topic and
automatically update contents of a second visualizer window based on a selection of one of the hierarchically organized component, wherein the visualizer window and the second visualizer window are displayed concurrently.

18. The method of claim 17 wherein the processor to process the corpus such that the training result comprises a plurality of topics and wherein the step of displaying operates in response to a selected topic of the plurality of topics to display hierarchical content associated with the selected topic.

19. The method of claim 18 wherein the processor to select the model from a plurality of models each model trained using a different corpus comprised of text data captured from one or different sources and different time periods.

20. The method of claim 19 wherein the processor to process a plurality of corpus captured at different points in time using the model to build an event stream and displaying the event stream for each of the plurality of topics.

* * * * *